Feb. 14, 1967     C. F. JONAS     3,304,118
ANTI-GLARE SHIELD ATTACHMENT FOR SUN VISORS
AND FRICTION HINGE THEREFOR
Original Filed Nov. 9, 1961
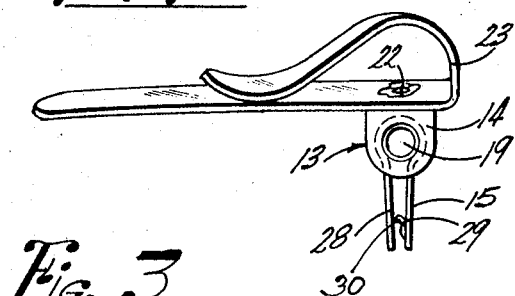
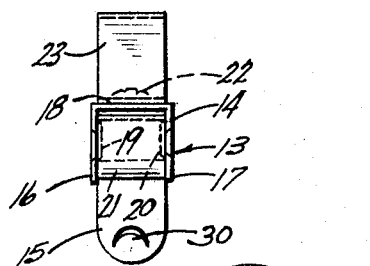
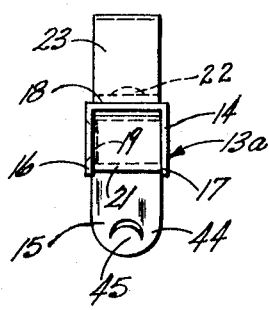
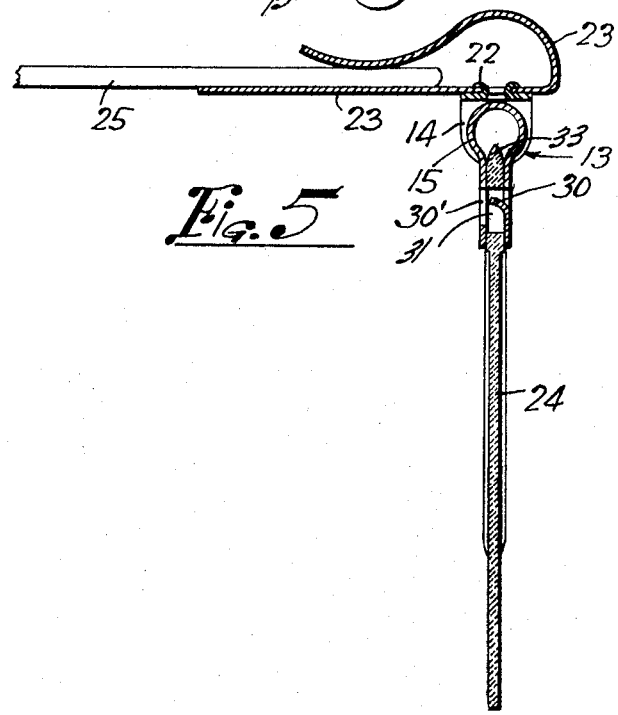
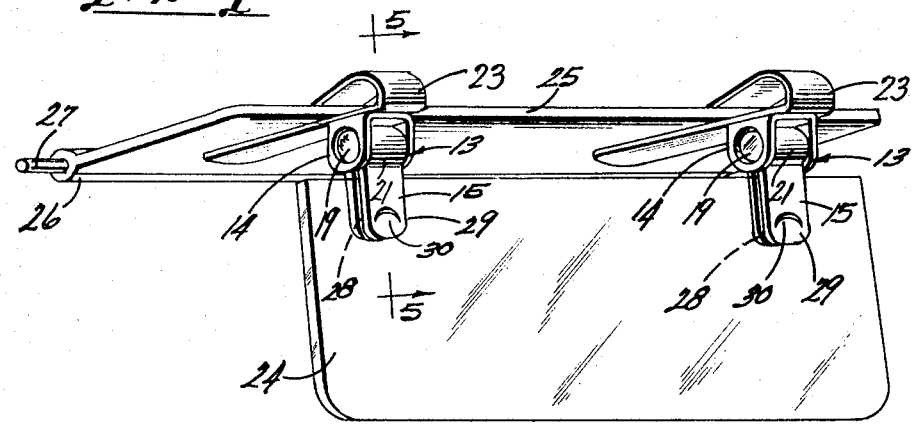
INVENTOR
CLARENCE F. JONAS
ATTORNEY

United States Patent Office 3,304,118
Patented Feb. 14, 1967

3,304,118
ANTI-GLARE SHIELD ATTACHMENT FOR SUN VISORS AND FRICTION HINGE THEREFOR
Clarence F. Jonas, 518 Market St., Rockford, Ill. 61107
Original application Nov. 9, 1961, Ser. No. 151,340, now Patent No. 3,226,763, dated Jan. 4, 1966. Divided and this application Oct. 22, 1965, Ser. No. 502,203
4 Claims. (Cl. 296—97)

This application is a division of my copending application, Serial No. 151,340, filed November 9, 1961, now U.S. Patent 3,226,763.

The invention relates to an auxiliary glare shield attachment for application on and adjustment with respect to an automobile sun visor, and one of the principal objects is to provide an inexpensive and lightweight friction hinge for adjustably mounting the glare shield on the sun-visor, said hinge comprising an outer U-shaped hinge member of spring steel provided on a clip detachably engageable over the edge of the visor, and an inner hinge member that receives a frusto-conical projection on at least one side of the U-shaped outer hinge member in the tubular knuckle provided on the outer end of the inner hinge member as an integral part of a generally U-shaped sheet metal clip adapted to straddle and be secured in a novel manner on the edge portion of a suitably colored plastic glare shield panel, that is foldable out of the way against the visor when not in use and can be swung into any desired angular relationship thereto when in use, the friction in the two hinges used in this way serving to hold the shield in any of its selected positions of adjustment and yet allowing easy adjustment to a different position.

The invention is illustrated in the accompanying drawing, in which—

FIGS. 1 and 2 are two views of a pinless sheet metal hinge especially designed and adapted for use on an automobile glare shield, the hinge being shown mounted on a clip that is detachably engageable over the edge of a sun visor;

FIG. 3 is a view similar to FIG. 2 showing a simpler and cheaper modification in which the hinge has only a single frusto-conical trunnion instead of the two trunnions illustrated on the hinge of FIG. 2;

FIG. 4 is a perspective view of an automobile sun visor with a glare shield mounted thereon in accordance with my invention by means of two hinges of the kind shown in FIG. 2 or 3, and FIG. 5 is a sectional detail on the line 5—5 of FIG. 4 to better illustrate the novel mode of fastening.

The same reference numerals are applied to corresponding parts throughout these views.

Referring first to FIGS. 1 and 2, the reference numeral 13 designates a pinless sheet metal hinge made in accordance with my invention comprising an outer U-shaped hinge member 14 of spring steel stock and an inner hinge member 15 also of spring steel stock. The use of spring steel stock is important especially in the inner hinge member because of the need for resilience in the arms 16 and 17 relative to the cross-portion 18 so that the frusto-conically indented circular trunnions 19 and 20 that are provided on the arms 16 and 17 respectively, will be held properly engaged under spring pressure with line contact in a circle annularly of the periphery thereof in the opposite ends of the tubular knuckle 21 that is provided preferably as a curled integral end portion on the outer end of the inner hinge member 15, leaving preferably a slight clearance between the ends of the knuckle 21 and the arms 16 and 17, so that there is no unnecessary frictional drag on the operation of the hinge where freedom of movement is desired. The cross-portion 18 of each of two U-shaped outer hinge members 14 is riveted or otherwise suitably secured, as indicated at 22, to the spring clips 23, two of which are used for mounting the glare shield 24 detachably as an attachment on the outer edge portion of an automobile sun visor 25 in remote relationship to the pivoted edge 26 thereof that is carried on the usual swivelled supporting rod 27 over an automobile windshield. The inner hinge members 15 are attached by the clips 23 to the inner edge of the suitably colored glare shield 24, so that the glare shield when not in use may be folded flatly against the visor 25 and be out of the way, permitting the visor to be used in the conventional manner. Thus, when there is a need for a glare shield, as when driving toward a setting sun, the glare shield 24 can be unfolded, as shown in FIG. 4, to provide the needed protection for the eyes of the driver.

In these smaller hinges 13 it is practical and feasible either to reduce the diameter and/or depth of the frusto-conical indentations 19—20 and/or eliminate one of the trunnions 19 and 20, as shown by the hinge 13a in FIG. 3, where there is only the one trunnion 19, the hinge 13a being otherwise the same as the hinge 13, such a construction being easier to assemble and being well adapted for supporting such a light load structure as the glare shield.

The inner hinge members 15 are generally U-shaped, as seen in FIGS. 1 and 4, providing the two arms 28 and 29 that are normally disposed in closely spaced parallel relation, the arm 29 having a deeply indented eye-brow projection 30 punched inwardly therefrom in registering relation to a hole 30' provided on the other arm, the projection 30 being adapted to snap into a hole 31 provided in the cut-out edge portion 32 of the glare shield when the latter is thrust edge-wise upwardly between the arms 28 and 29. Such inward movement is made relatively easy because of the wedge-shaped portion 33 on the cut-out edge portion 32 of the shield which can be entered easily between the converging ends of the arms 28 and 29, further inward movement being rendered easy also because of the inward inclination of the eye-brow projection 30. Withdrawal of the shield is positively prevented once the eye-brow projection 30 snaps down into the hole 31.

It is believed the foregoing description conveys a good understanding of the objects and advantages of my invention. The appended claims have been drawn to cover all legitimate modifications and adaptations.

I claim:
1. A pinless hinge of the character described comprising an outer spring steel hinge member of generally U-shape providing opposed closely spaced arms of a length and width appropriate for the weight and size of the object to be hingedly mounted thereon and which are springable normally toward each other but adapted to be spread apart to substantially parallel relationship to support the knuckle portion of an inner hinge member therebetween, the spacing of said arms being approximately the same as the length thereof, and a sheet metal inner hinge member having a curled generally cylindrical end portion defining a knuckle portion disposed endwise between and holding said arms spread apart and defining a substantially cylindrical bore therein open at both ends, the opposite ends of said knuckle portion being flat and substantially parallel and one end of the bore being closed by reason of one of said flat ends having direct pivotal bearing abutment with a flat surface provided on the inner side of one of said arms of said outer hinge member, the other of said arms of said outer hinge member having an inwardly depressed circular portion of the wall thereof defining a flat ended frusto-conical trunnion projection thereon pivotally engaged annularly of the periphery thereof with line contact in the other end of the bore of said knuckle portion, said trunnion projection being of small but uniform height in relation to diameter and the diameter being the major portion of the width of said arm, whereby this construction requires less springing apart of said arms in order to insert this knuckle portion between them in bearing relationship to said trunnion in assembling the hinge.

2. A glare shield attachment for a sun visor having a longitudinal edge portion, the said attachment comprising a generally rectangular transparent glare shield panel having two longitudinally spaced openings provided therein in inwardly spaced relation to one longitudinal edge thereof, and a pair of spaced hinges for hingedly mounting said panel by said longitudinal edge portion on one longitudinal edge portion of said visor, each of said hinges comprising an inner hinge member made of spring steel bent to a generally U-shaped form providing a bight portion and two arms that are normally disposed in closely spaced parallel relation, the bight portion of the U being defined by a generally cylindrical knuckle portion parallel to the longitudinal edge portion of said panel and open at both ends, one of said arms having integral therewith an inwardly inclined projection flexible relative thereto, which, when the edge portion of said panel is thrust between said arms causing the arms to be spread apart and said projection to be flexed as it rides over the edge portion of said panel, finally snaps down into place in one of said openings in the edge portion of said panel to retain the panel against displacement from said inner hinge member, and an outer hinge member made of spring steel bent to generally U-shape providing spaced substantially parallel arms at least one of which has a circular indentation to enter one end of said knuckle portion when the two arms are disposed in tight engagement with opposite ends of said knuckle portion for pivotally mounting the inner hinge member on the outer hinge member, and means attached to the cross-portion of said outer hinge member for mounting the same on the longitudinal edge portion of said visor.

3. A structure as set forth in claim 2 wherein the edge portion of said panel in which the two longitudinally spaced openings are provided has a coplanar wedge-shaped portion facilitating the entry of said edge portion between the two arms of the inner hinge member to spring them apart, said wedge-shaped portion further facilitating the further spreading apart of said arms upon engagement with the inclined projection on one of said arms and facilitating its riding up onto one side of the edge portion of said panel prior to snapping of said projection into one of said openings in said panel.

4. A structure as set forth in claim 2 wherein the other of said arms of said inner hinge member has an opening provided therein in register with and receiving the inclined projection provided on the first mentioned one of said arms before the arms are spread apart by entry of the edge portion of the panel therebetween.

References Cited by the Examiner
UNITED STATES PATENTS

| | | |
|---|---|---|
| 1,468,197 | 9/1923 | Downing. |
| 1,469,102 | 9/1923 | Olcott. |
| 1,531,694 | 3/1925 | Downing. |
| 2,829,919 | 4/1958 | Bartlett _____ 296—97 |

BENJAMIN HERSH, *Primary Examiner.*

J. A. PEKAR, *Assistant Examiner.*